United States Patent
Jones

(10) Patent No.: US 9,463,540 B2
(45) Date of Patent: Oct. 11, 2016

(54) PISTON RAIL RING INSTALLER AND METHOD

(71) Applicant: Honda Motor Co., Ltd., Tokyo (JP)

(72) Inventor: Brian G. Jones, Talladega, AL (US)

(73) Assignee: Honda Motor Co., Ltd., Tokyo (JP)

(*) Notice: Subject to any disclaimer, the term of this patent is extended or adjusted under 35 U.S.C. 154(b) by 110 days.

(21) Appl. No.: 14/302,478

(22) Filed: Jun. 12, 2014

(65) Prior Publication Data

US 2015/0360335 A1    Dec. 17, 2015

(51) Int. Cl.
*B23P 19/08* (2006.01)
*B25B 27/12* (2006.01)

(52) U.S. Cl.
CPC .............. *B23P 19/088* (2013.01); *B25B 27/12* (2013.01); *Y10T 29/49258* (2015.01); *Y10T 29/536* (2015.01)

(58) Field of Classification Search
CPC .... B23P 19/008; B25B 27/12; Y10T 29/536; Y10T 29/53604; Y10T 29/53609
See application file for complete search history.

(56) References Cited

U.S. PATENT DOCUMENTS

| 4,084,727 A * | 4/1978 | Albers .................. B23P 19/088 |
| | | 221/298 |
| 5,259,109 A | 11/1993 | Fefeu et al. |
| 5,303,465 A | 4/1994 | Fujimoto et al. |
| 5,404,629 A | 4/1995 | Liechty et al. |
| 5,588,208 A | 12/1996 | Sato et al. |
| 5,592,740 A | 1/1997 | Liechty et al. |
| 7,757,368 B2 | 7/2010 | Uemura et al. |

\* cited by examiner

*Primary Examiner* — Christopher Besler
*Assistant Examiner* — Matthew P Travers
(74) *Attorney, Agent, or Firm* — Rankin, Hill & Clark LLP

(57) ABSTRACT

A ring installer and method for installing piston rings on a piston includes an axial pusher, a radial pusher and a translating device. The axial pusher axially moves a cartridge of piston rail rings to position an end rail ring of the piston rail rings into a preinstall position. The radial pusher radially enlarges the end rail ring to separate the end rail ring from the piston rail rings. The translating device receives the end rail ring from the radial pusher and axially moves the end rail ring to an install position that is axially spaced apart from the cartridge of piston rail rings and from the preinstall position wherein the end rail ring is in alignment with a piston groove of the piston.

15 Claims, 5 Drawing Sheets

PISTON RAIL RING INSTALLER AND METHOD

BACKGROUND

Piston rail ring installers and methods are generally known. In such installers and methods, a piston ring is installed on a vehicle piston. In one arrangement, the piston ring is provided as a thin piston ring and a pair of such thin piston rings are applied to a piston in flanking positions relative to a spacer ring and together the thin piston rings and the spacer ring comprise an oil ring set on the piston. Conventionally, the spacer ring is first assembled into the piston ring groove and then each side rail ring is assembled into each groove portion formed between the spacer ring and respective groove surfaces of the piston. Example piston ring installers and methods are disclosed in U.S. Pat. Nos. 5,259,109 and 5,303,465, both incorporated herein in their entireties.

Such piston rail rings can be difficult to install using conventional installers and methods due to the thickness of the rail rings and/or inside surface coatings applied to the rail rings. For example, the rail rings are typically very thin (e.g., 0.4 mm), which can cause the rings to twist or bend when expanded by ring magazines on which the rail rings are disposed. This can make it difficult to index rings off the top of the ring magazine tube and into the piston groove of the piston. Further, some rings also have a coating on the inside diameter surface of the rings, which can cause the rings to stick together when indexing.

SUMMARY

According to one aspect, a vehicle piston rail ring installer includes an axially movable pusher for axially moving a cartridge of piston rail rings and positioning an end rail ring of the cartridge of piston rail rings in a preinstall position. The installer also includes a radially movable pusher device arranged for radially engaging the end rail ring in the preinstall position and separating the end rail ring from the cartridge of piston rail rings by radially expanding the end rail ring into an expanded state. The installer further includes a translating device for radially receiving the end rail ring in the expanded state from the radially movable pusher device and then axially moving the end rail ring while in the expanded state to an installed position wherein the end rail ring is in axially alignment with a piston groove on an associated piston and radially contracts into the piston groove.

According to another aspect, a method of installing piston rail rings on a piston is provided. More particularly, in accordance with this aspect, the method includes axially moving a cartridge of piston rail rings to position an end rail ring of the cartridge of piston rail rings in a preinstall position. The end rail ring is then radially engaged in the preinstall position and separated from the cartridge of piston rail rings by radially expanding the end rail ring into an expanded state. The end rail ring is then axially moved while in the expanded state into an install position wherein the end rail ring is in axial alignment with a piston groove on the piston for radial contraction into the piston groove.

According to a further aspect, a ring installer for installing piston rings on a piston includes an axial pusher, a radial pusher and a translating device. The axial pusher axially moves a cartridge of piston rings to position an end ring of the piston rings into a preinstall position. The radial pusher radially enlarges the end ring to separate the end ring from the piston rings. The translating device receives the end ring from the radial pusher and axially moves the end ring to an install position that is axially spaced apart from the cartridge of piston rings and from the preinstall position wherein the end ring is in alignment with a piston groove of the piston.

DETAILED DESCRIPTION

Figure 1:
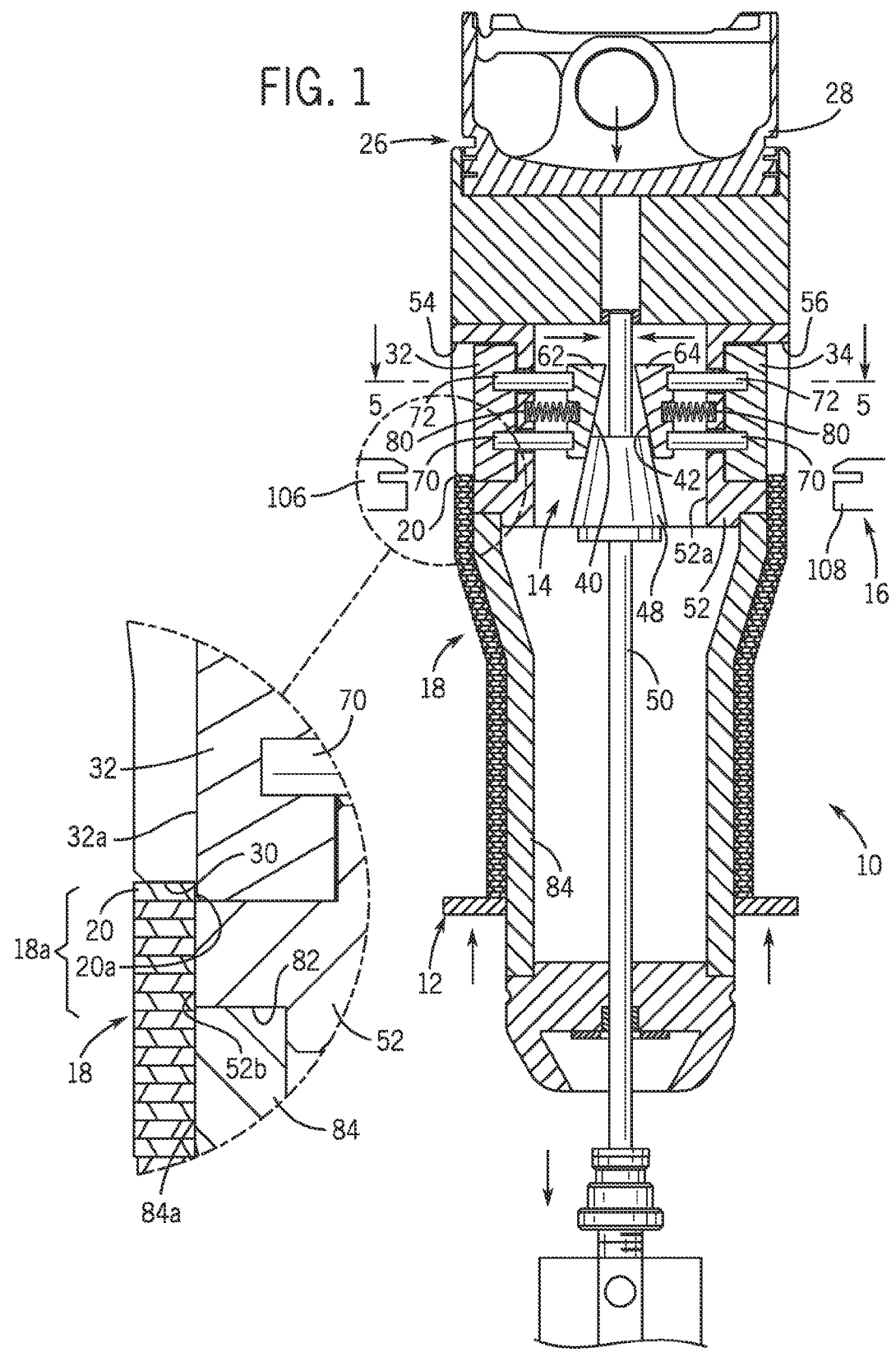
FIG. 1 is an elevational cross-sectional view of a piston rail ring installer according to an exemplary embodiment and shown with an end rail ring in a preinstall position for installation onto a piston received by the installer.
Figure 2:
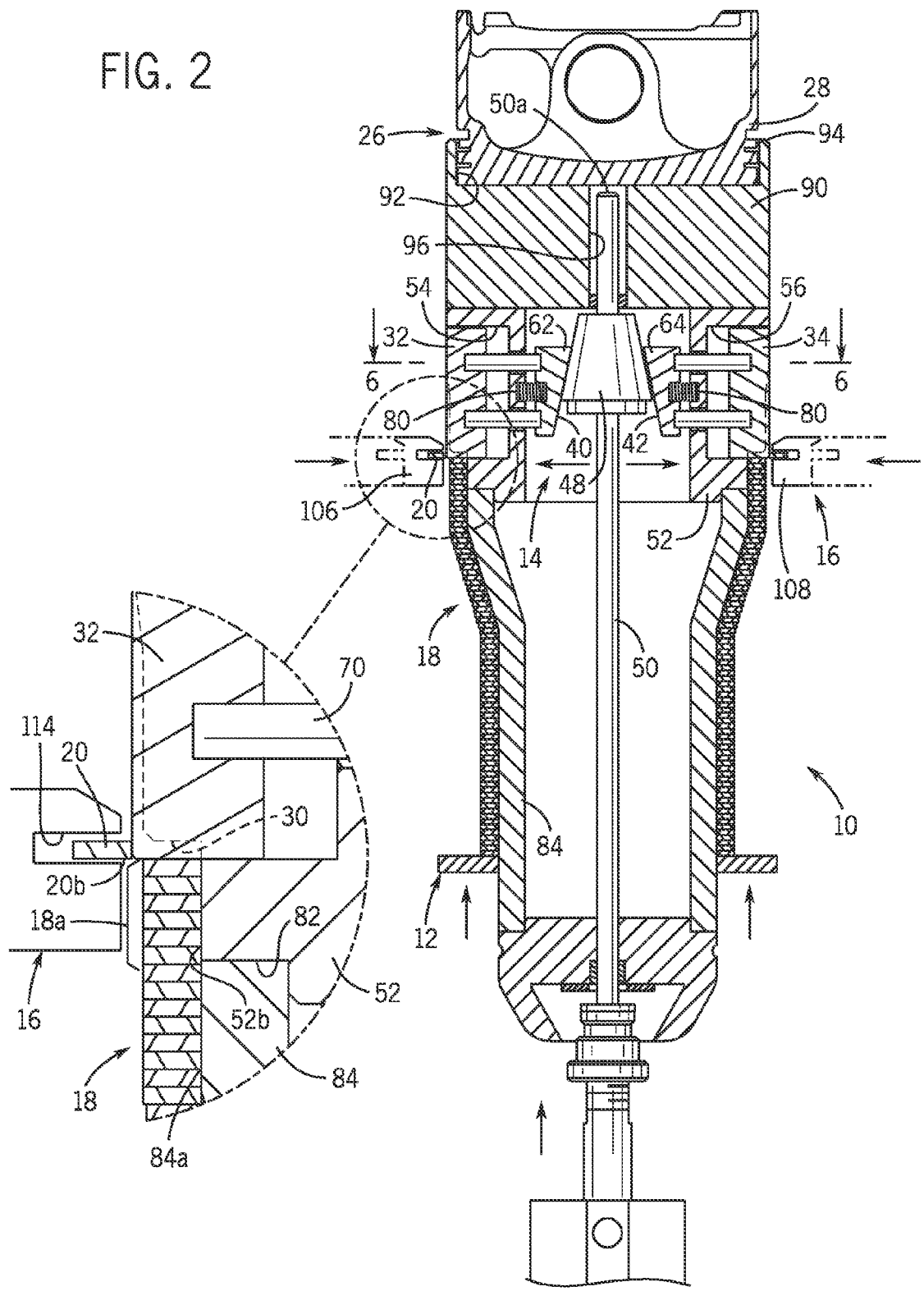
FIG. 2 is an elevational cross-sectional view of the piston rail ring installer similar to FIG. 1 but shown with a radially movable pusher device of the installer radially engaging the end rail ring to move the end rail ring from the preinstall position to separate the end rail ring.

Referring now to the drawings, wherein the showings are for purposes of illustrating one or more exemplary embodiments and not for purposes of limiting the same, FIGS. 1 and 2 show a vehicle piston rail ring installer according to an exemplary embodiment and generally indicated by reference numeral 10. As will be described in more detail herein, the ring installer 10 can install piston rings on a piston. For example, the ring installer can install side rail rings on a vehicle piston in flanking relation relative to a spacer as part of a piston oil ring assembly. As such, the ring installer 10 can optionally be referred to as a vehicle piston rail ring installer.

The ring installer 10 of the illustrated embodiment includes an axially movable pusher 12, a radially movable pusher device 14 and a translating device 16. As will be described in detail herein, the axially movable pusher 12 is for axially moving a cartridge of piston rail rings 18 and positioning an end rail ring 20 of the cartridge of piston rail rings 18 in a preinstall position (the position shown in FIG. 1). The radially movable pusher device 14 is arranged for radially engaging the end rail ring 20 in the preinstall position (the position of FIG. 1) and separating the end rail ring 20 from the cartridge of piston rail rings 18 by radially expanding the end rail ring 20 into an expanded state (the state shown in FIG. 2).

Figure 3:
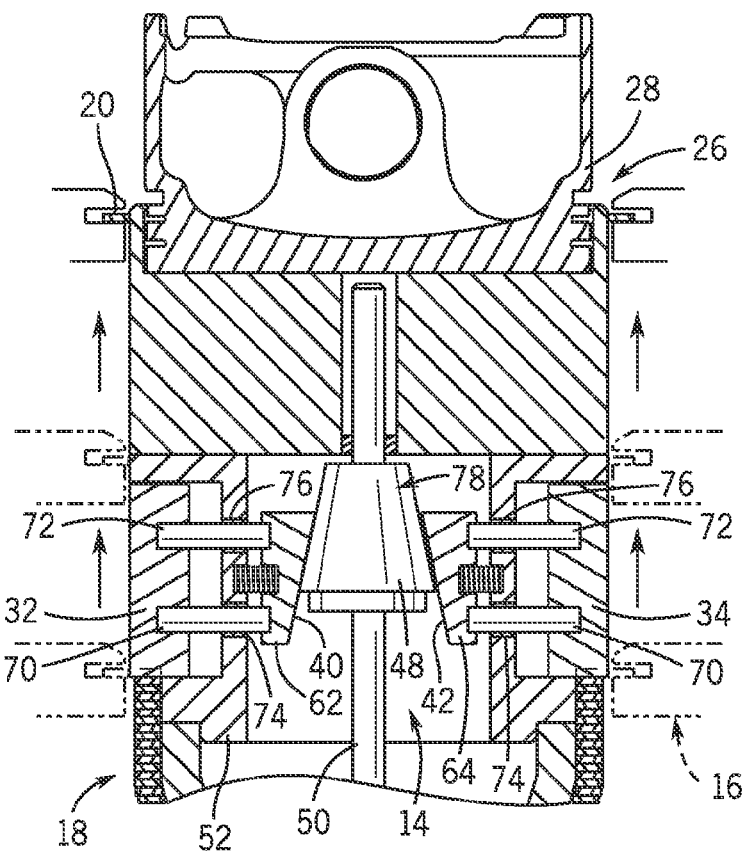
FIG. 3 is a partial cross-sectional view of the piston rail ring installer similar to the upper portion of FIG. 2 but shown with a translating device of the installer axially moving the end rail ring toward an install position that is in axial alignment with a piston groove on the piston received in the installer.
Figure 4:
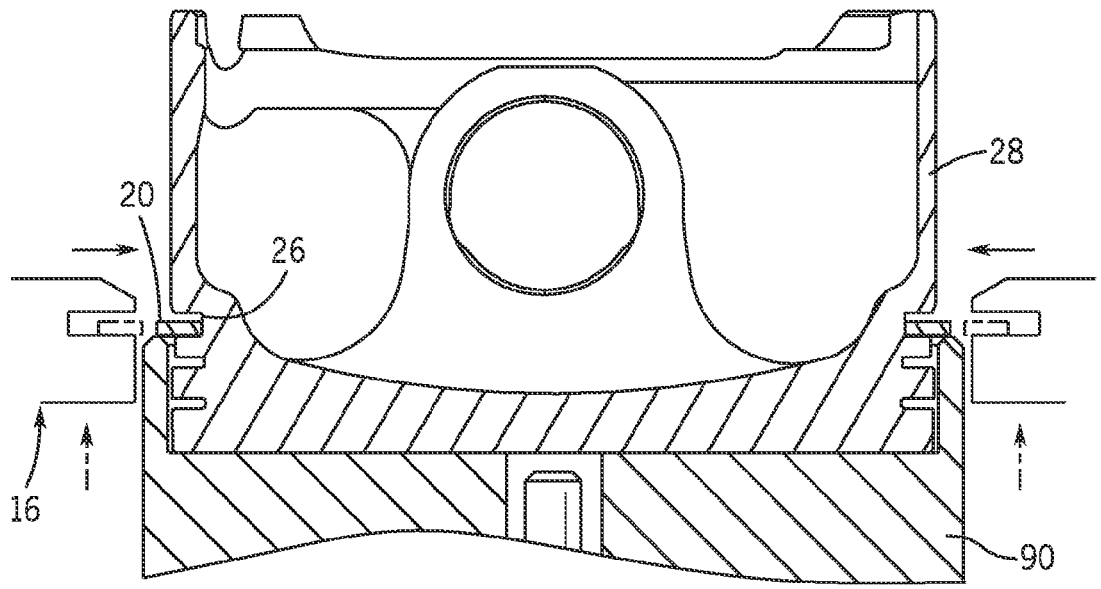
FIG. 4 is a partial enlarged cross-sectional view similar to an upper portion of FIG. 3 but shown with the translating device fully aligned with the piston groove and showing the end rail ring having radially contracted so as to be received in the piston groove of the piston.

The translating device 16 is arranged for radially receiving the end rail ring 20 in the expanded state from the radially movable pusher device 14 and then axially moving the end rail ring 20 while in the expanded state (and as shown in FIG. 3) toward and to an install position wherein the end rail ring 20 is in axial alignment with a piston groove 26 defined on an associated piston 28 so that the end rail ring 20 can radially contract and be received into the piston groove 26 (as shown in FIG. 4). In particular, the radially movable pusher device 14 can elastically expand the end rail ring 20 radially from the preinstall position shown in FIG. 1 to the expanded state shown in FIG. 2 to thereby enable the end rail ring 20 to be axially moved into position relative to the piston 28 and then radially contract to an original shape when in alignment with the piston groove 26 of the piston 28. In other words, when the end rail ring 20 is elastically expanded, the end rail ring 20 retains its ability to return to its original shape and does so when enabled via being moved to the install position shown in phantom in FIG. 4.

With specific reference to FIGS. 1 and 2, the preinstall position is defined by a radial shoulder 30 that the end rail ring 20 is axially moved into contact with by the axially movable pusher 12. That is, the axially movable pusher 12 moves the entire cartridge of piston rail rings 18 axially toward the radial shoulder 30 and so the end rail ring 20 engages and is blocked from further axial movement by the radial shoulder 30. As shown, the radial shoulder 30 is axially spaced apart from a lower axial edge of one or more pushers (e.g., pushers 32, 34, 36 and 38) of the radially movable pusher device 14 by a distance approximately equal to a width of the end rail ring 20 to enable the end rail ring 20 to be radially separated from the cartridge of piston rail rings 18.

The radially movable pusher device 14 of the illustrated embodiment includes at least one pusher (e.g., pushers 32, 34, 36, 38 shown best in FIGS. 5 and 6) adapted for radial reciprocating movement and at least one radially tapered driven surface (e.g., driven surfaces 40, 42, 44, 46 shown best in FIGS. 5 and 6) fixedly secured to the at least one pusher such that radial movement of the at least one radially tapered driven surface translates into radial movement of the at least one pusher. The radially movable pusher device 14 further includes at least one radially tapered driven surface 48 adapted to contact the at least one radially tapered driving surface and a driving rod 50 fixedly connected to the at least one radially tapered driving surface 48. Movement of the at least one radially tapered driving surface 48 against the at least one radially tapered driven surface translates axial movement, such as axial movement of the driving rod 50, into radial movement, such as radial movement of the at least one pusher. The driving rod 50 is adapted for axial reciprocating movement such that movement of the driving rod 50 in a first axial direction toward the at least one radially tapered driven surface axially moves the at least one radially tapered driving surface into the at least one radially tapered driven surface which thereby moves the at least one radially tapered driven surface and the at least one pusher in a radially outward direction into the end rail ring 20.

Figure 5:
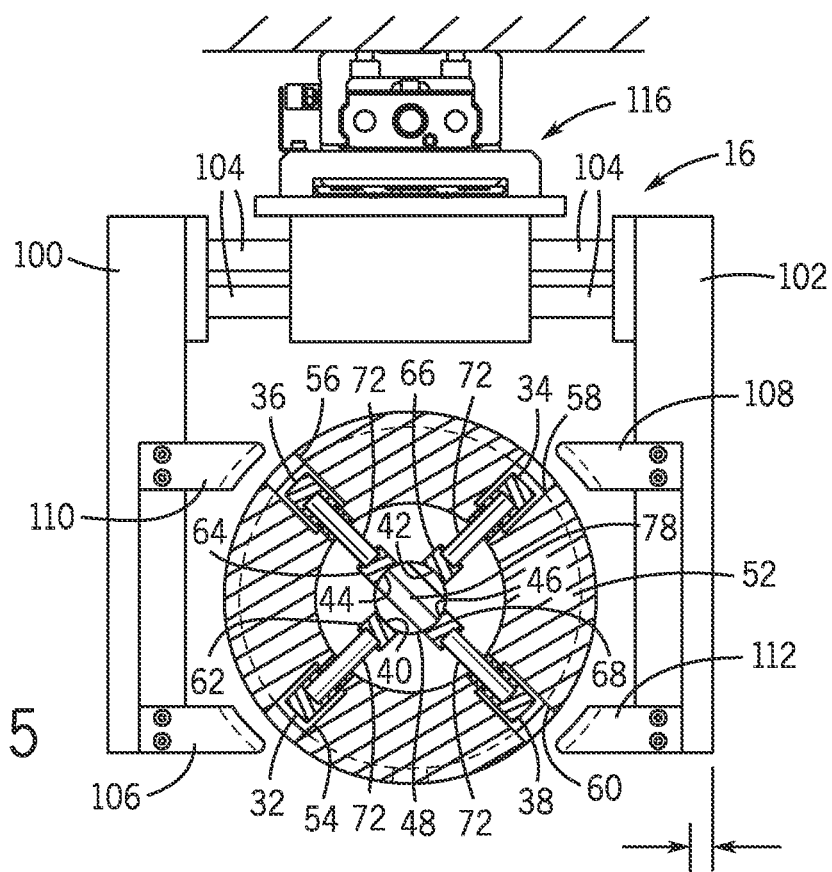
FIG. 5 is a cross-sectional view taken along the line 5-5 of FIG. 1.
Figure 6:
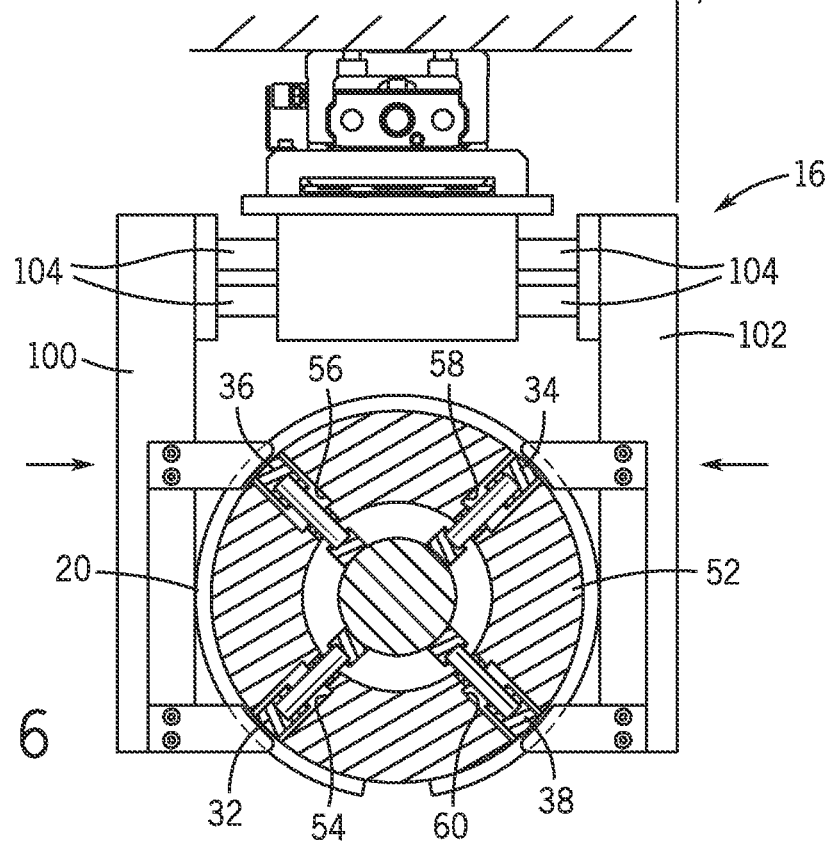
FIG. 6 is a cross-sectional view taken along the line 6-6 of FIG. 2.

In the illustrated embodiment, as best shown in FIGS. 5 and 6, the at least one pusher is a plurality of pushers (e.g., pushers 32, 34, 36 and 38) angularly spaced apart from one another by equal angular distances. More specifically, in the illustrated embodiment, the plurality of pushers includes four pushers 32, 34, 36, 38. The radially movable pusher device 14 further includes a main member 52 defining radially extending grooves 54, 56, 58, 60 along which, respectively, the plurality of pushers 32, 34, 36, 38 are radially movable. The at least one radially tapered driven surface is a plurality of radially tapered driven surfaces 40, 42, 44, 46 defined, respectively, on shoes 62, 64, 66, 68, with one shoe associated with each of the plurality of pushers 32, 34, 36, 38 (e.g., the shoe 62 is associated with the pusher 32). Each shoe 62, 64, 66, 68 is connected to a corresponding one of the plurality of pushers 32, 34, 36, 38 by at least one radially extending arm member (e.g., arm members 70, 72 shown in FIG. 3) extending through at least one radial aperture (e.g., radial apertures 74, 76 shown in FIG. 3) defined in the main member 52. As shown, in the illustrated embodiment, the at least one radially tapered driving surface 48 can be a conical surface defined on a driving member 78 that engages the shoes 62, 64, 66, 68 when the driving member 78 is axially driven by the driving rod 50.

The at least one pusher (i.e., pushers 32, 34, 36, 38 in the illustrated embodiment) is urged by a biasing device toward a retracted radial position (the position(s) shown in FIG. 1) wherein a contact surface of the at least one pusher (e.g., contact surface 32a of pusher 32) is radially aligned with an inner radial surface 20a of the end rail ring 20 when in the preinstall position. In the illustrated embodiment, the biasing device 80 is a spring associated with each pusher 32, 34, 36, 38 that is interposed between an inner diameter wall 52a of the main member 52 and the shoe 62, 64, 66, 68 of each pusher 32, 34, 36, 38. As such, the spring 80 urges the shoe radially inwardly, which via the arm members 70, 72 urges the associated pusher radially inwardly.

The radial shoulder 30, into which the axially movable pusher 12 pushes the cartridge of piston rail rings 18, is defined on the main member 52. The radial shoulder 30 engages the end rail ring 20 and limits further axial movement of the cartridge of piston rail rings 18 until the end rail ring 20 is separated from the cartridge of piston rail rings 18. As best shown in FIGS. 1 and 2 for pushers 32 and 34, each of the plurality of pushers 32, 34, 36, 38 extends axially from the radial shoulder 30 to an underside 20b of the end rail ring 20 such that, when the pushers 32, 34, 36, 38 are moved radially outwardly into the end rail ring 20, the pushers 32, 34, 36, 38 separate the end rail ring 20 from the cartridge of piston rail rings 18. As shown, the main member 52 defines a circumferential surface 52b extending axially from the radial shoulder 30 along a group 18a of the cartridge of piston rail rings 18 disposed immediately below the end rail ring 20. As shown, the main member 52 can define an underside shoulder 82 into which a cartridge member 84 of the cartridge of piston rail rings 18 is receivable. The circumferential surface 52b is continuous with an outer diameter surface 84a of the cartridge member 84.

A receiver member 90 can be disposed on an upper side of the main member 52 or, alternatively, can be integrally formed with the main member 52. As shown, the receiver member 90 includes a piston recess 92 into which the piston 28 is receivable. The piston recess 92 can be sized such that when the piston 28 is fully received therein, the piston groove 26 is aligned with a distal flange end 94 of the receiver member 90. Additionally, the receiver member 90 can include an aperture 96 into which a distal end 50a of the driving rod is received when the driving rod 50 is moved to its extended position shown in FIG. 2.

With reference now to FIGS. 5 and 6, the translating device 16 will be described in more detail. In the illustrated embodiment, the translating device 16 includes arm members 100, 102 that are movable on slides 104 toward and apart from one another. Additionally, the translating device 16 includes four fingers or finger members 106, 108, 110, 112. The four fingers 106, 108, 110, 112 are angularly aligned, respectively, with the four pushers 32, 34, 36, 38. Each finger 106, 108, 110, 112 of the translating device 16 defines a groove 114 (see FIG. 2) for accommodating the end rail ring 20 in the expanded state. An operating device 116 for providing power and control of the arms 100, 102 can be operatively connected thereto. Accordingly, the operating device 116 can move the arms 100, 102 from the position shown in FIG. 5 toward one another to the position shown in FIG. 6 when the end rail ring 20 is in the expanded position and ready to be axially moved from alignment with the preinstall position to the final install position that is in alignment with the piston groove 26. Movement of the fingers 106, 108 from the positions shown in FIG. 5 to the positions shown in FIG. 6 is also illustrated schematically in FIG. 2 (fingers 110, 112 are not visible in FIG. 2). Once the end rail ring 20 is received within the grooves 114 of the finger members 106, 108, 110, 112, the operating device 116 can axially move the end rail ring 20 as shown in FIG. 3 from an axial position in alignment with the preinstall position toward and to the final install position illustrated in FIG. 4.

Figure 7:
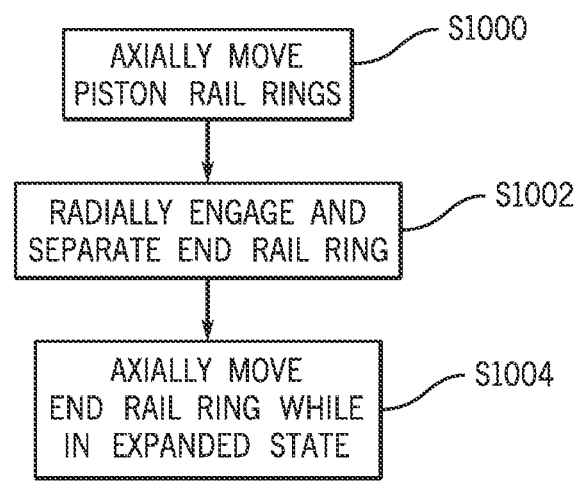
FIG. 7 is a process flow diagram showing a method of installing piston rail rings on a piston according to an exemplary embodiment.

With reference now to FIG. 7, a method of installing piston rail rings on a piston will be described. In particular, the method of FIG. 7 will be described in association with the rail ring installer 10 described hereinabove, though this is not required and the method could be used with other installers. In the method, as shown at S1000, the cartridge of piston rail rings 18 is axially moved to position the end rail ring 20 of the cartridge of piston rail rings 18 in a preinstall position (i.e., the position shown in FIG. 1). Next, at S1002, the end rail ring 20 is radially engaged in the preinstall position and the end rail ring 20 is separated from the cartridge of piston rail rings 18 by radially expanding the end rail ring 20 into an expanded state as shown in FIG. 2. Still next, as shown at S1004, the end rail ring 20 is axially moved while in the expanded state into an install position wherein the end rail ring 20 is in axial alignment with the piston groove 26 on the piston 28 for radial contraction into the piston groove 26. In contrast to prior art installers, it is noted that the end rail ring 20 is axially moved individually while being separated from the cartridge of end rail rings 18.

As already described herein, radially expanding the end rail ring 20 in S1002 includes only elastically radially expanding the end rail ring so that the end rail ring 20 can contract into the piston groove 26 of the piston 28 via returning to its normal position. Radially engaging and separating the end rail ring in S1002 particularly includes engaging the inner diameter of the end rail ring 20 with at least one pusher (e.g., pushers 32, 34, 36, 38) and moving the at least one pusher radially outwardly to expand the end rail ring 20. More particularly, radially engaging and separating the end rail ring in S1002 includes axially moving the driving rod 50 from the position shown in FIG. 1 to the position shown in FIG. 2 to cause the driving surface 48 of the driving member 78 into sliding contact with the driven surfaces 40, 42, 44, 46 of the shoes 62, 64, 66, 68, which thereby radially moves the pushers 32, 34, 36, 38 outwardly.

After the end rail ring 20 is installed in the piston groove 26 of the piston 28, the translating device 16 can be operated via the operating device 116 so as to return to the axial position shown in FIGS. 1 and 2 and to further return to the radial positions of the arms 100, 102 to the positions shown in FIG. 5. Simultaneously, the driving rod 50 can be returned to the position shown in FIG. 1 which results in the pushers 32, 34, 36, 38 returning to their radially retracted positions shown in FIG. 1 via the springs 80.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle piston rail ring installer, comprising:
   an axially movable pusher arranged for axially moving a cartridge of piston rail rings and positioning an end rail ring of the cartridge of piston rail rings in a preinstall position;
   a radially movable pusher device arranged for radially engaging the end rail ring in the preinstall position and separating the end rail ring from the cartridge of piston rail rings by radially expanding the end rail ring into an expanded state, wherein the radially movable pusher device includes at least one pusher that engages the end rail ring on a radially inward side of the end rail ring and the at least one pusher radially moves outwardly to elastically expand the end rail ring radially to the expanded state to initially separate the end rail ring from the cartridge of piston rail rings; and
   a translating device arranged for radially receiving the end rail ring in the expanded state from the radially movable pusher device and then axially moving said end rail ring while in the expanded state to an install position wherein the end rail ring is in axial alignment with a piston groove on an associated piston and radially contracts into the piston groove, wherein the translating device includes at least two fingers that each define a groove for accommodating the end rail ring in the expanded state.

2. The piston rail ring installer of claim 1 wherein the radially movable pusher device enables the end rail ring to radially contract to an original shape when in alignment with the piston groove, and wherein the radially movable pusher device and the translating device apply no radial contraction force on the end rail ring.

3. The piston rail ring installer of claim 1 wherein the preinstall position is defined by a radial shoulder that the end rail ring is axially moved into contact with by the axially movable pusher, the radial shoulder axially spaced apart from a lower axial edge of a pusher of the radially movable pusher device by a distance approximately equal to a width of the end ring rail to enable the end rail ring to be radially separated from the cartridge of piston rail rings.

4. The piston rail ring installer of claim 1 wherein the radially movable pusher device includes:
   the at least one pusher adapted for radial reciprocating movement;
   at least one radially tapered driven surface defined on a shoe associated with the at least one pusher, wherein the at least one radially tapered driven surface is fixedly secured to the at least one pusher such that radial movement of the at least one radially tapered driven surface translates into radial movement of the at least one pusher;
   at least one radially tapered driving surface adapted to contact the at least one radially tapered driven surface, movement of the at least one radially tapered driving surface against the at least one radially tapered driven surface translating axial movement into radial movement; and
   a driving rod fixedly connected to the at least one radially tapered driving surface and adapted for axial reciprocating movement such that movement of the driving rod in a first axial direction toward the at least one radially tapered driven surface axially moves the at least one radially tapered driving surface into the at least radially tapered driven surface which thereby moves the at least one radially tapered driven surface and the at least one pusher in a radially outward direction into the end rail ring.

5. The piston rail ring installer of claim 4 wherein the at least one pusher is urged by a biasing device toward a retracted radial position wherein a contact surface of the at least one pusher is radially aligned with an inner radial surface of the end rail ring when in the preinstall position.

6. The piston rail ring installer of claim 4 wherein the at least one pusher is a plurality of pushers angularly spaced apart from one another by equal angular distances.

7. The piston rail ring installer of claim 6 wherein the plurality of pushers includes at least two pushers and the translating device includes at least two fingers of the translating device are angularly aligned, respectively, with the at least two pushers.

8. The piston rail ring installer of claim 6 wherein the radially movable pusher device includes a main member defining radially extending grooves along which the plurality of pushers are radially movable.

9. The piston rail ring installer of claim 8 wherein the at least one radially tapered driven surface is a plurality of radially tapered driven surfaces defined, respectively, on shoes with one shoe associated with each of the plurality of pushers, each shoe connected to a corresponding one of the plurality of pushers by at least one radially extending arm member extending through at least one radial aperture defined in the main member.

10. The piston rail ring installer of claim 9 wherein the at least one radially tapered driving surface is a conical surface defined on a driving member that engages the shoes when the driving member is axially driven by the driving rod.

11. The piston rail ring installer of claim 1 wherein the radially movable pusher device includes a main member defining a radial shoulder toward which the axially movable pusher pushes the cartridge of piston rail rings, the radial shoulder engaging the end rail ring and limiting further axial movement of the cartridge of piston rail rings until the end rail ring is separated from the cartridge of piston rail rings.

12. The piston rail ring installer of claim 11 wherein the radially movable pusher device includes a plurality of pushers that each extend axially from the radial shoulder to an underside of the end rail ring such that, when the pushers are moved radially outwardly into the end rail ring, the pushers separate the end rail ring from the cartridge of piston rail rings.

13. The piston rail ring installer of claim 12 wherein the main member defines a circumferential surface extending axially from the radial shoulder along a group of the cartridge of piston rail rings disposed immediately below the end rail ring.

14. The piston rail ring installer of claim 13 wherein the main member defines an underside shoulder into which a cartridge member of the cartridge of piston rail rings is receivable, the circumferential surface contiguous with an outer diameter surface of the cartridge member.

15. A ring installer for installing piston rings on a piston, comprising:
an axial pusher that axially moves a cartridge of piston rings to position an end ring of the piston rings into a preinstall position;
a radial pusher that radially enlarges the end ring beyond an original shape to an expanded state to initially separate the end ring from the piston rings without radially contracting the end rail ring, wherein the radial pusher includes at least one pusher that engages the end rail and radially moves outwardly to elastically expand the end rail ring radially; and
a translating device that receives the end ring from the radial pusher in the expanded state without further radial expansion or radial contraction and axially moves the end ring to an install position axially spaced apart from the cartridge of piston rings and from the preinstall position wherein the end ring is in alignment with a piston groove of the piston to allow the end rail ring to elastically contract radially from the expanded state, wherein the translating device includes at least two fingers that each define a groove for accommodating the end rail ring in the expanded state.

* * * * *